Oct. 14, 1969  F. C. MARINO ET AL  3,472,449
RECORDING SYSTEM FOR BUSINESS MACHINES
Filed Aug. 31, 1967  5 Sheets-Sheet 1

*INVENTORS*
FRANCIS C. MARINO
HERMAN SIMON
BY
ATTORNEYS

FIG. 4

Oct. 14, 1969  F. C. MARINO ET AL  3,472,449
RECORDING SYSTEM FOR BUSINESS MACHINES
Filed Aug. 31, 1967  5 Sheets-Sheet 3

INVENTORS
FRANCIS C. MARINO
HERMAN SIMON
BY
ATTORNEYS

Oct. 14, 1969     F. C. MARINO ET AL     3,472,449
RECORDING SYSTEM FOR BUSINESS MACHINES
Filed Aug. 31, 1967                5 Sheets-Sheet 5

INVENTORS
FRANCIS C. MARINO
HERMAN SIMON
BY

ATTORNEYS

United States Patent Office 3,472,449
Patented Oct. 14, 1969

3,472,449
RECORDING SYSTEM FOR BUSINESS MACHINES
Francis C. Marino, Huntington, and Herman Simon, Plainview, N.Y., assignors to Digitronics Corporation, Albertson, N.Y., a corporation of Delaware
Filed Aug. 31, 1967, Ser. No. 664,872
Int. Cl. G06c 13/00
U.S. Cl. 235—61                                16 Claims

ABSTRACT OF THE DISCLOSURE

A data recording system for business machines of the type having character and function keys for sequentially recording the characters entered into the machine and the functions performed by the machine in a form presentable to a computer and the like. The system includes recording means including an encoder-recorder responsive to a pulse for generating a signal representative of the operated key and for recording the same. A pulse producing means for producing the pulse to initiate operation of the recording means is adapted to be connected to the recording means by individually selectively operable character key switch means which are operated by the associated character keys. The pulse producing means includes a pulse generator which produces a pulse when it is connected with the recording means and a connecting means adapted to be actuated by a character key during operation of a character key for connecting the pulse generator with the character key switches. The character key switches and the connecting means are operable to connect the pulse generator with the recording means only after the entry of a character has been assured by operation of the associated character key thereby to ensure a direct correspondence between the character entered into the machine and the recorded character.

---

The present invention relates generally to recording systems, and, more particularly, pertains to a recording system which is adapted to be used in conjunction with a key-stroke operated business machine for recording, on an appropriate medium, the entries made into and the functions performed by the machine.

Direct data communication between machines such as computers and the like is becoming more widespread as methods and facilities for accomplishing substantially error-free transmission of data are expanded. For example, telephone companies presently provide facilities for the transmission of data between machines over existing telephone lines. This service has been found to be particularly useful to those companies having, for example, a central office and a number of subsidiary or branch offices separated by relatively large distances. To be more specific, a computer may be located at a main or central office which receives data, such as accounting data or the like, from the branch or subsidiary offices. A system of this type results in a tremendous economic saving with regard to the cost of equipment since only one centrally located computer is required rather than a plurality of computers, each one of which is located at a different branch office.

Presently, in order to take advantage of a communication system of the type described above, conventional business such as adding machines, comptometers and the like are being provided with recording systems for simultaneously converting and recording the information entered into such business machines in data signals which may be applied to a computer. Thus, the complete bookkeeping records of all the branch offices of a multi-division organization may be fed directly into a central computer so that the complete accounting picture of the business may be maintained up to date.

It will become obvious that in a data transferral system of the type described there must be a direct identity or correspondence between each character entered into a business machine and the function performed by the machine and the corresponding character or function recording system to eliminate any errors. To put this another way, if a character entered into the business machine represents the digit "3" and the corresponding character recorded by the recording system represents a digit other than "3," a gross error will be introduced into the system. Hence, it is of primary importance to assure a perfect one-to-one correspondence between the machine and the recording system entries.

Errors of the type referred to hereinabove may arise in any one of a number of different manners, such as by an incomplete key-stroke on the part of the operator, or by a so-called dithering key-stroke (i.e. a key-stroke which includes some slight backward or irregular motion). An incomplete key-stroke may commit the recording system to record the character or the function represented by the operated key; however, the stroke may be insufficient to commit the business machine to mechanically enter the character or to perform the desired function. Hence, a discrepancy will exist between the machine entry and the recorded entry. On the other hand, an irregular or dithering key-stroke motion may cause the recording system to record a plurality of entries while the business machine only registers a single entry.

Accordingly, an object of the present invention is to provide a recording system for business machines for recording the operations of the machine in data form which substantially eliminates any discrepancies between the machine entries and the recorded entries.

A more specific object of the present invention resides in the novel details of circuitry which provides a recording system which records a character only after the machine has been mechanically committed to enter the corresponding or identical character, thereby to eliminate errors due to incomplete key-strokes.

A further object of the present invention is to provide a recording system for a business machine which insures only one recorded entry for each mechanical commitment of the business machine, thereby to eliminate discrepancies which may arise due to irregular key motion.

Another object of the invention is to provide a recording system of the type described which is compatible for use in conjunction with existing business machines, so that such a machine easily may be adapted to record entries in data form for application to computers and the like.

A further object of the present invention is to provide a recording system for a business machine which records the characters entered into the machine and the functions performed by the machine sequentially, thereby to eliminate unnecessary memory elements, as when the information is presented in parallel.

Still another object of the invention is to provide a recording system for a business machine which is economic to produce and reliable in operation.

As noted hereinabove, the recording system of the present invention is adapted to be utilized in key-stroke operated business machines having a plurality of selectively and individually operable character and function keys. Each of the character key represents a preselected character. Accordingly, when a character key is operated the character represented by that operated key is entered into the machine. On the other hand, when a function key is operated the machine executes a function cycle corresponding to the operated function key such as addition, subtraction, and the like.

In furtherance of the above objects, a recording system constructed according to the present invention includes recording means responsive to a pulse for producing signals representative of the operated character keys and for recording the signals sequentially. Pulse producing means is provided for producing a pulse to operate said recording means. The system also includes key switch means for at least preselected ones of the character keys operable by the respective character keys for connecting the pulse producing means with the recording means. Specifically, the pulse producing means includes a pulse generator for producing a pulse when it is connected to the recording means, and connecting means actuable by the operation of a character key for connecting the pulse generator with the character key switch means. The connecting means and a character key switch is adapted to establish a connection between the pulse generator and the recording means after the machine has been mechanically committed to enter a desired character to provide a direct correspondence between the characters entered into the machine and the recorded entries.

Other objects and advantages of the present invention will become more apparent from a consideration of the following detailed description when taken in conjunction with the accompanying drawings, in which.

As noted above, the recording system of the present invention is ideally suited for use in conjunction with any type of conventional key-stroke operated business machine for recording sequentially the characters entered into and the functions performed by the machine. For purposes of illustration, the device of the present invention will be described in conjunction with the operation of an adding machine and, in particular, the Odhner electric adding machine model E11C–2, which is manufactured by the Aktiebolaget Original-Odhner, Gothenburg, Sweden. The construction of this machine is representative of the construction of many key-stroke operated business machines presently commercially available. Only those portions of the machine which are pertinent to a clear understanding of the recording system of the present invention will be disclosed. However, further information on the machine may be obtained from publications of the Odhner Corporation, such as their service manual and their catalogue of spare parts.

It is emphasized that the adding machine referred to herein is for illustrative purposes only and is not to be interpreted as being a limitation of the present invention. That is, the recording system of the present invention may be utilized with any type of key-stroke operated business machine.

In the interest of clarity, the operation of the character entry portion of the adding machine will be presented first. This will be followed by a detailed description of the portion of the recording system of the present invention relating to the recording of character entries. Thereafter, the various function cycle operations of the machine will be described. This will be followed by a description of that portion of the recording system of the present invention which relates to the recording of signals representative of the functions performed by the machine.

Figure 1:
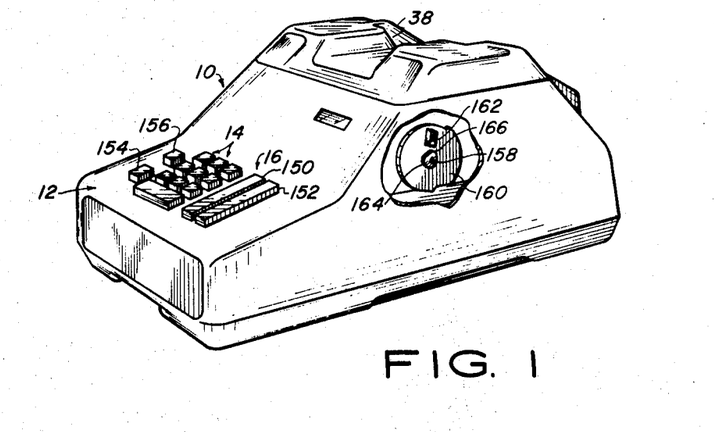
FIG. 1 is a perspective view of an adding machine, with parts broken away, which may be utilized with the recording system of the present invention.

FIG. 1 illustrates a key-stroke operated adding machine which is designated generally by the reference numeral 10 of the type which is adapted to be used in conjunction with the recording system of the present invention. The adding machine 10 includes a keyboard 12 having a plurality of character keys designated generally by the reference numeral 14 and a plurality of function keys designated generally by the numeral 16. As is conventional with machines of this type, there are ten character keys 18–36 (FIG. 2) which respectively represents the digits "1–0." The character keys 14 may be individually and selectively depressed to cause the corresponding selected digits to be entered into the machine. On the other hand, the function keys 16 may be individually and selectively depressed to cause the machine to perform specific functions, such as add, subtract, or to produce a sub-total or the like, in a well known manner. Defined in the top surface of the machine 10 is an opening 38 through which a paper tape record (not shown) showing the various entries introduced into the machine may pass. Accordingly, the operator of the machine thereby has an instantaneous record of the characters entered into the machine and the totals, sub-totals, etc. of these characters, as the case may be. Since the operation of the paper tape record portion of the machine 10 is not pertinent to an understanding of the present invention, it will not be discussed in detail herein.

Figure 2:
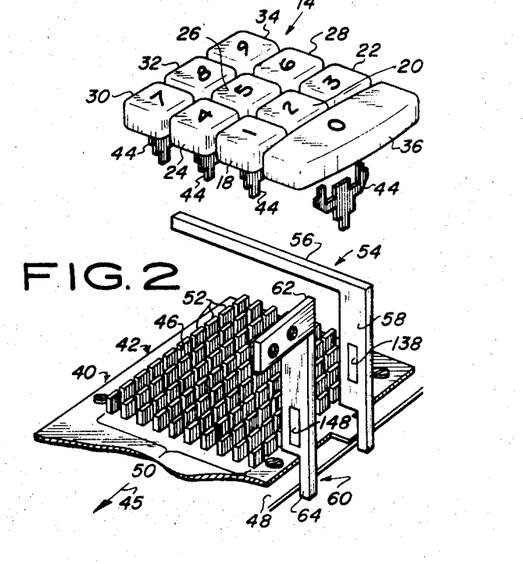
FIG. 2 is an exploded perspective view of the elements comprising the memory portion of the machine shown in FIG. 1.

As shown more particularly in FIG. 2, the character keys 18–36 include finger-pieces, each one of which has a different digit etched in the upper surface thereof corresponding to the digit represented by that individual key. For example, the finger-piece of the key 18 bears the numeral or digit "1" thereon. Accordingly, the depression or operation of this particular character key will cause the digit or numeral "1" to be entered into the machine 10. Depending from each one of the character keys 18–36 is a leg member 44 which is connected, by an appropriate linkage mechanism (not shown) to a memory or registry device which is described in detail hereinbelow. Thus, when one of the character keys 18–36 is depressed or moved to an operated position, the digit represented by that particular character key will be entered into the memory device. In other words, the selected digit will be entered into the machine 10. When the addition function key is then operated, the number represented by the digits preserved in the memory device will be printed out on the paper tape record in the conventional manner. Additionally, the number will be entered into a storage device (not shown) which accumulates the sum of the numbers entered into the machine and which prints out the accumulated sum of these numbers as a total or as a sub-total depending upon which function key has been operated.

The memory or registry device is designated generally by the reference numeral 40 in FIG. 2 and includes a carriage 42 which is movable in the direction indicated by an arrowhead 45. The carriage 42 includes an upper plate 46 and a lower plate 48 which support a plurality of longitudinally spaced columns 50 of ten transversely spaced memory or register pins 52 which are adapted to be moved from a rest position to an operated position to register the entry of a character into the machine. The columns 50 correspond in number to the number of columns of digits which may be entered into the machine 10. For example, the left-hand column 50 corresponds to the first column of digits which are entered into the machine (i.e., the units column). On the other hand, the right-hand column 50 represents the last column of digits which would be entered into the machine 10.

The first nine memory pins 52 in any one of the columns 50 respectively corresponds to the digits "0–8" represented by the respective character keys 36 and 18–32. In the particular example illustrated, there is no memory register pin 52 which corresponds to the digit or numeral "9." Accordingly, the absence of an operated pin 52 in a column 50 through which the carriage 42 has been stepped indicates that the numeral or digit "9" has been entered into the machine for that particular column.

A linkage mechanism (not shown) connects the character keys 14 with the memory device 40 and normally overlies the first column 50 (the left-hand column as taken in FIG. 2) which corresponds to the unit column of digits. As each digit is entered into the machine 10 to produce a row of digits corresponding to the desired number the carriage 42 is stepped from one column to the next, That is, as a digit or character is entered into one column 50, the carriage 42 is stepped so that the next column 50 underlies the linkage mechanism.

To be more specific, biasing means (not shown) bias the character keys 18–36 upwardly to a rest or non-operated position. The keys are adapted to be depressed to an operative position thereby to enter the digit represented by the operated character key into the memory device 40. In other words, when one of the character keys 18–32 or 36 is depressed, the pin 52 corresponding to that operated character key will be moved from the normal or rest position downwardly to the operated position.

The character keys 18–36 are also adapted to operate a member 54 when any one of the character keys is operated to enter a digit into the memory device 40. More particularly, the member 54 includes a laterally projecting arm 56 and a downwardly extending leg 58 which is positioned at the front of the carriage 42. An appropriate linkage mechanism (not shown) is provided to connect the character keys 18–36 with the arm or lever 56 so that the operation of any one of the character keys 18–36 will cause the member 54 to move downwardly. For purposes noted in detail hereinbelow, a separate member 60 is provided which is operable by the character key 36 representing the zero digit. The member 60 generally includes a longitudinally extending lever or arm 62 and a downwardly projecting leg 64. The operation of the character key 36 causes the downward movement of both the member 54 and member 60.

As noted hereinabove, as a digit is entered into the memory device 40, the carriage 42 is stepped one column position so that a digit may be entered into the next column 50. The indexing means for stepping the carriage 42 from column to column is not described in detail herein. However, further information on the indexing apparatus may be obtained by reference to copending applications Ser. No. 620,040, filed Mar. 2, 1967, now abandoned, entitled "Recording System for Business Machines."

Summarizing the character entering operation of the machine 10, the depression of any one of the character keys 18–32 or 36 will cause a register or memory pin 52 corresponding to the character key representing the desired digit to be moved from its upper normal rest position to its lower operated position simultaneously with the downward movement of the member 54. (It is to be noted that if the character key 36 representing the zero digit is operated, both the member 54 and the member 60 will be moved downwardly.) To put this in another way, when a pin 52 has been moved to the operated position the machine 10 as been mechanically committed to enter a character. Moreover, this mechanical commitment will occur at some point in the downward travel of the operated character key. Additionally, the escapement or indexing apparatus will be actuated to step the carriage 42 one column position.

In the illustrated adding machine under consideration the indexing apparatus steps the carriage 42 from column to column in two steps. As described in the copending application referred to above, on the downstroke of a character key the carriage 42 is stepped to an intermediate position. This is referred to as the forward mechanical commitment point or level of the machine and occurs when a digit has been entered into the memory device. When the key is released it returns to its rest position. At a point in its upward travel the operated character key causes the carriage 42 to move to the next column position. This point is referred to as the reverse mechanical commitment point or level of the machine.

A mechanical interlock means is provided to prevent the entry of more than one digit in a particular column. The interlock is designated generally by the reference numeral 66 in FIG. 3 and comprises a track 68 having a plurality of spacing elements 70 therein. A plurality of fingers 72 are provided which are individually aligned with the space between respective adjacent ones of the spacing elements 70. The fingers 72 are normally in spaced relation to the spacing elements 70.

Figure 3:
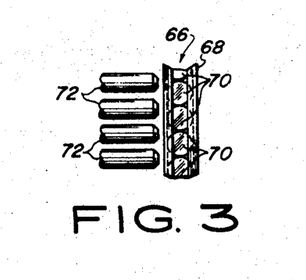
FIG. 3 is a top plan view of a portion of the interlock mechanism.

Each one of the fingers 72 is connected to a different one of the character keys 18–36 by an appropriate link (not shown). When a character key is depressed, the finger 72 connected thereto will move forward relative to the spacing elements 70 and extend between two adjacent spacing elements. The track 68 and the spacing elements 70 are sized so that the distance between all the spacing elements and the ends of the track are substantially equal to the widths of a single finger 72. Accordingly, when one finger 72 is received between a pair of spacing elements 70, the spacing elements will be forced against each other and the end spacing elements 70 will be forced against the ends of the track. Since each spacing element 70 is in engagement with the next adjacent spacing element the possibility of any one of the other fingers 72 moving therebetween, as when a person attempts to depress a second character key, will be eliminated. Hence, the interlock 66, in effect, prevents the depression of more than one of the character keys 18–36 at any one time. Moreover, because the memory device 40 is advanced one column each time a character key is depressed, it will be obvious that the interlock 66 is operable to prevent the entry of more than one digit in a column 50.

Having now described the character entering features of the adding machine 10 which are pertinent to an understanding of the character recording portion of the systemof the present invention, this aspect of the invention will now be described in detail.

In general, a recording system constructed according to the present invention includes a plurality of character key switches which are individually and selectively operable by respective one of the character keys to connect a pulse producing means with a recording means. The pulse producing means includes a pulse generator which is adapted to produce a pulse after it has been connected to the recording means. In order to avoid the recording of a character due to an incomplete keystroke (i.e. an operation in which one of the character keys is not fully depressed so that the digit is not entered into the memory device 40) the pulse producing means includes a switching device which is serially connected between the pulse generator and the character key switches. The switching device and the character key switches are positioned to connect the pulse generator to the recording means only after the machine has been mechanically committed to enter a digit, thereby to assure correspondence between the machine entry and the recorded entry.

Additionally, the pulse generating means is further adapted to prevent the generation of more than a single pulse until the carriage 42 has been stepped to the next column position. Thus, an irregular key movement which may cause the associated character key switch to open and close a number of times will not produce corresponding erroneous entries in the recording mechanism.

Figure 4:
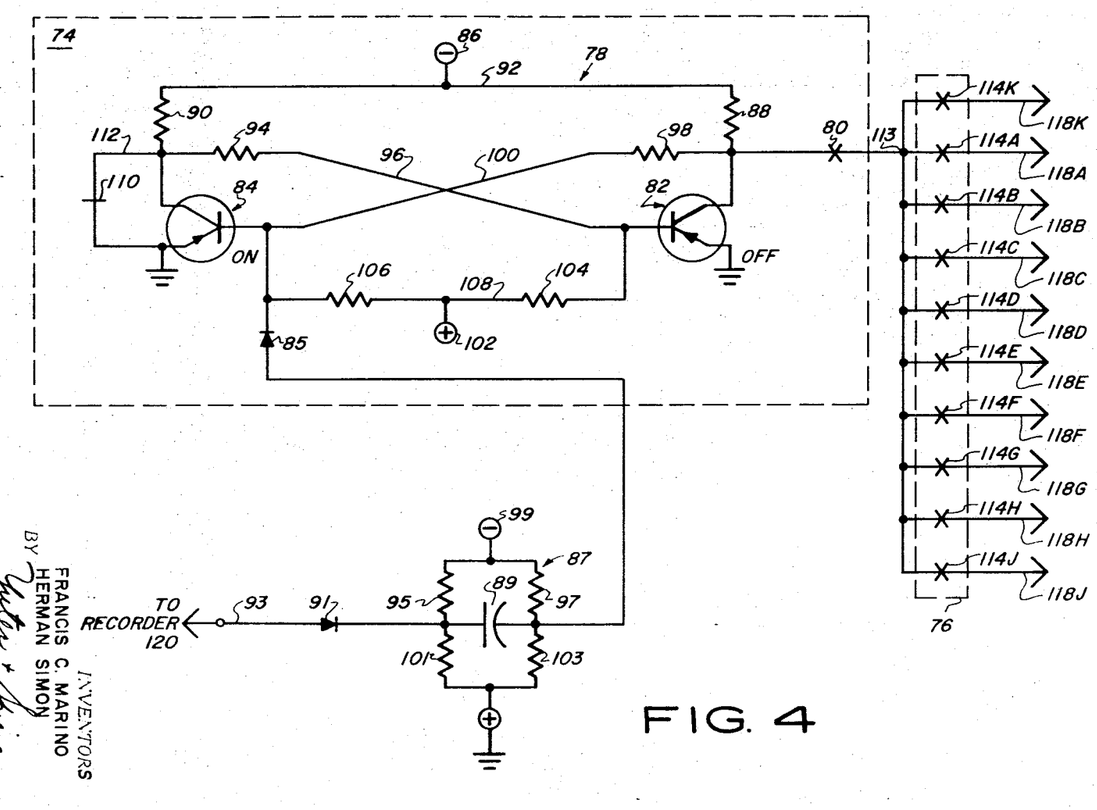
FIGS. 4 and 5 are schematic circuit wiring diagrams, partially in block form, of a recording system constructed according to the present invention.
Figure 5:
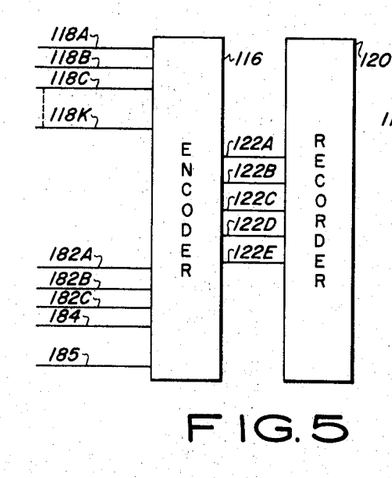

More specifically, a schematic circuit wiring diagram of the recording system of the present invention is shown in FIGS. 4 and 5. The recording system includes a pulse producing network designated generally by the reference numeral 74 and a plurality of normally open character key switches which are designated generally by the reference numeral 76. The pulse producing network 74 comprises a bistable multivibrator or pulse generator 78 and a connecting device in the form of a normally open magnetic reed switch 80 which is operable to connect the bistable multivibrator 78 to the character key switches 76 when the switch 80 is closed.

The bistable multivibrator or pulse generator 78 includes a normally "on" PNP transistor 84 and a normally "off" PNP transistor 82. The collector electrodes of the transistors 82 and 84 are connected to a negative source of potential 86 through respective resistors 88 and 90 by a lead 92. The emitter electrodes of the transistor 82 and 84 are connected to ground. The base electrode of the transistor 82 is connected to the collector electrodes of the transistor 84 through a resistor 94 by a lead 96. Similarly, the base electrode of the transistor 84 is connected to the collector electrode of the transistor 82 through a resistor 98 by a lead 100. Moreover, the base electrodes of the transistors 82 and 84 are connected to a positive source of potential 102, through respective resistors 104 and 106, by a lead 108. The collector electrode of the transistor 82 is connected to one side of the normally open switch 80 and the other side of the switch 80 is connected to a junction 113. The junction 113 is connected to one side of the normally open character key switches 76. Additionally, the collector electrode of the transistor 84 is adapted to be connected to ground through a normally closed magnetic reed switch 110 which is connected between the collector and the emitter electrodes of the transistor 84 by a lead 112. The magnetic reed switches 80 and 110 are adapted to be closed and opened, respectively, when any one of the character keys is depressed to enter a character into the machine 10. When the character key is released and returns to its rest position, the magnetic reed switches revert back to their original state in which the switch 80 is open and the switch 110 is closed.

Connected to the base electrode of transistor 84, through a diode 85 is a pulse gate network designated generally by the reference numeral 87. The network 87 includes a capacitor 89 having one terminal connected to the anode of the diode 85 and the other terminal connected to a recorder 120 through a diode 91 by a lead 93. Connected across the capacitor 89 are resistors 95 and 97, the junction of which is connected to a negative source of potential 99. Also connected across the capacitor 89 are resistors 101 and 103, the junction of which is connected to ground, the diode 91 is polarized to pass a positive pulse from the recorder 120 to the capacitor 89 and the diode 85 is polarized to pass a positive pulse from the capacitor 89 to the base electrode of the transistor 84.

The character key switches 76 include a plurality of normally open switches 114A–114K (there is no switch 114I) which are selectively and individually operable by the respective character keys 18–36. As noted above, one side of the switches 114A–114K is connected to the common junction 113. The other side of the switches 114A–114K is connected to an encoder 116 (FIG. 5) by respective leads 118A–118K. The output terminals of the endcoder are connected to the input terminals of the recorder 120 by five binary-coded data leads 122A–122E.

The recorder 120 may preferably take the form of a tape deck which records eletronic signals in a form presentable for application to a computer input. The encoder 116 is adapted to produce different output signals representative of the respective characters which are entered into the machine 10 in accordance with which one of the leads 118A–118K transmits a pulse to the encoder. For example, if a pulse appears on lead 118A in the manner indicated below, signifying that the "1" digit character key has been depressed, the encoder 116 will produce a unique combination of binary signals on the five data leads 122A–122E corresponding to the digit "1," and present this signal to the recorder 120. An encoder and recorder of the type contemplated are disclosed in copending application Ser. No. 554,473, filed May 10, 1965, entitled "Data Transmission Apparatus and Methods," now U.S. Patent No. 3,401,396.

Figure 6:
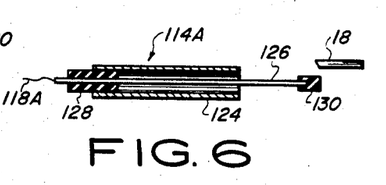
FIG. 6 is a vertical sectional view of a character key switch.

In practice, the switches 114A–114J are of the coaxial type and are positioned on the machine 10 directly below the finger-pieces of the respective character keys 18–34. On the other hand, the switch 114K of the magnetic reed type for the reasons indicated hereinbelow. More specifically, the character key switch 114A, which is representative of the plurality of coaxial character key switches, is shown in FIG. 6 and comprises a conducting outer sleeve 124 and a flexible and resilient coaxial inner conductor 126 which is maintained in spaced relationship to the sleeve 124 by an insulating member 128 connected to the rear end of the conductor 126. The conductor 126 projects beyond the front end of the sleeve 124 and receives an insulating member 130 on the end thereof. The end of the conductor 126 carrying the insulating member 130 is positioned below the finger-piece of the key 18 so that when the key 18 is depressed, the finger-piece engages and flexes the inner conductor 126 so that the conductor 126 contacts the outer sleeve 124 to close the character key switch. The outer sleeve 124 is connected to the junction 113 and the inner conductor 126 is connected to the encoder 116 via the lead 118A. Accordingly, when the switch 114A is closed, the junction 113 will be connected to the encoder 116. When a pulse appears on the lead 118A, the encoder will be actuated to produce a signal representative of the digit "1."

Figure 7:
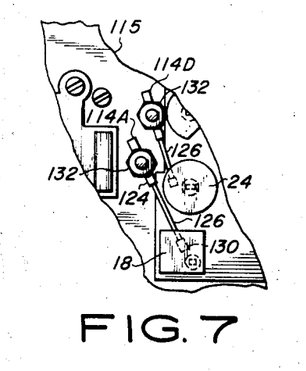
FIG. 7 is a fragmentary top plan view of the keyboard of the machine shown in FIG. 1, illustrating the relationship between the character keys and the character key switches.

As shown in FIG. 7, the character key switches, such as the key switches 114A and 114D, are maintained in place on a support plate 115 by screws 132. The inner conductors 126 are positioned below the respective finger-pieces of the associated keys, as set forth in the preceding paragraph. The character key switches associated with the remaining character keys are similarly positioned with respect to their associated keys.

Figure 8:
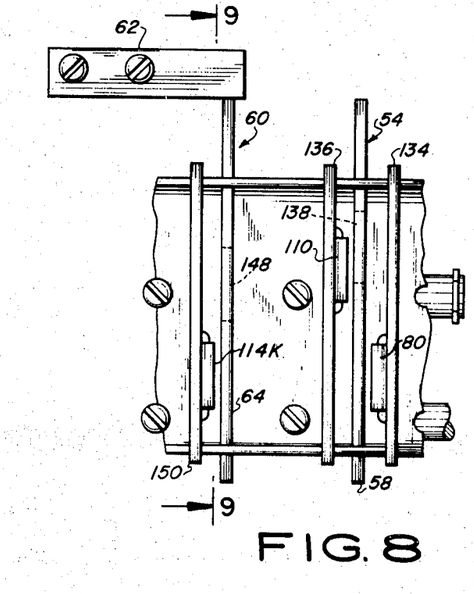
FIG. 8 is a front elevational view of the magnetic reed switch actuation assembly.
Figures 9, 10, 11:
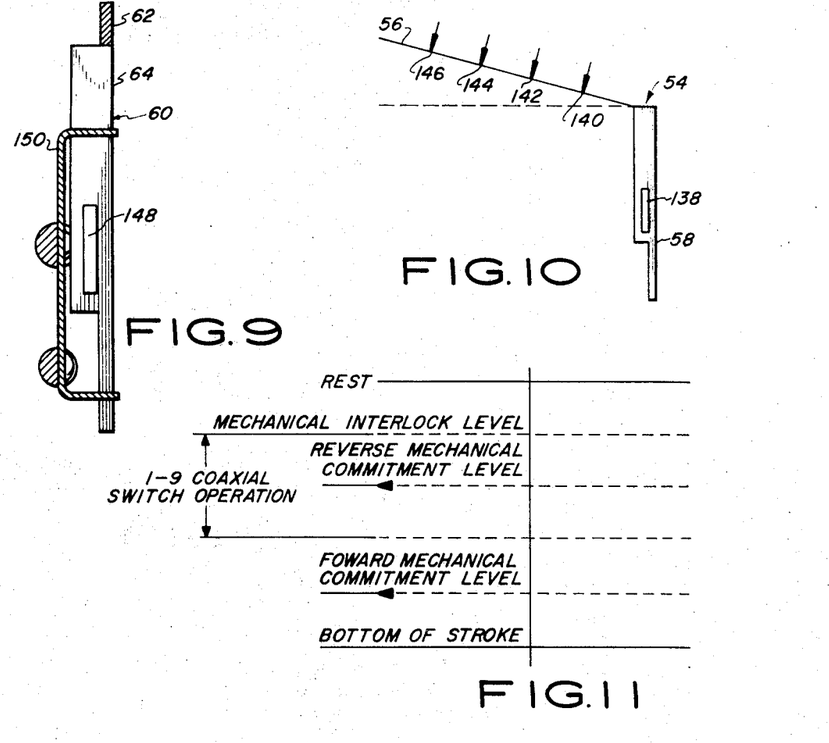
FIG. 9 is a side elevational view thereof, as seen looking along the line 9—9 of FIG. 8.
FIG. 10 is a diagrammatic representation of the points of engagement of the character keys with the magnetic reed switch actuation assemblies.
FIG. 11 is a graph showing the operating points of the machine as a function of key travel.

The magnetic reed switches 80, 110 and 114K and their respective actuation assemblies are shown in FIGS. 8 and 9. The magnetic reed switches 80, 110 are positioned on each side of the leg 58 of the member 54 at the front of the machine 10 by respective brackets 134 and 136. A magnet 138 which is adapted to actuate the magnetic reed switches 110 and 80 is carried by the leg 58 and is movable therewith. As noted hereinabove, when any one of the character keys 18–36 is depressed, the leg 58 moves downwardly thereby moving the magnet 138 downwardly with respect to the switches 110 and 80. As the downwardly moving magnet 138 moves adjacent the switches 110 and 80, the magnet opens the switch 110 and closes the switch 80. When the depressed character key is released, the leg 58 of the member 54 moves upwardly under the action of an appropriate biasing means, such as a spring (not shown) to a normal or rest position. When the member 58 is in the normal or rest position, the magnetic reed switches 80 and 110 will be in their normal state wherein the switch 80 is open and the switch 110 is closed.

As shown in FIG. 8, the switch 110 is positioned above the switch 80 so that the switch 110 will open prior to the operation of the switch 80 to the closed position. In practice, the switch 80 is positioned so that it will be closed simultaneously with or after the carriage 42 has been stepped to the intermediate position. On the other hand, the switch 110 is positioned so that it will reclose on the upward movement of the leg 58 corresponding to the movement of the carriage 42 to the next column position. In other words, the switch 80 closes on the forward mechanical commitment of the machine 10 and the switch 110 closes on the reverse mechanical commitment of the machine 10. Moreover, the magnet 138 maintains switch 110 open and the switch 80 closed until the member 54 begins to move upwardly.

The bistable multivibrator 78 is adapted to change states when it is connected to the encoder 116 through the switch 80 and any one of the character key switches 76 as noted in detail below. However, in the machine under consideration, the linkage mechanism between the character keys and the member 54 is such that the linkage mechanism engages the arm 56 of the member 54 at different points along the arm. This is indicated diagrammatically in FIG. 10.

Thus, the linkage mechanism connecting the rearmost keys 30–34 with the arm 56 will strike the arm 56 at a point 140 located adjacent to the leg 58. The linkage mechanism connecting the middle row of keys 24–28 with the arm 56 will strike the arm 56 at a point 142 spaced beyond the point 140. Similarly, the linkage mechanism connecting the first row of keys 18–22 with the arm 56 will strike the arm 56 at a point 144 spaced beyond the point 142. And the linkage mechanism connecting the character key 36 which represents the zero digit will strike the arm 56 at a point 146 adjacent to the end of the arm. It will be appreciated that the character keys associated with the point 140 will travel a much shorter distance than the character keys associated with the point 144 to cause the leg member 58 to travel the same distance. In light of this fact, as noted in detail below, the partial depression of the zero character key 36 followed by the operation of any one of the other character keys may result in a zero digit being entered into the machine 10 but the digit represented by the operated character key being entered into the recorder.

In order to eliminate the possibility of an error of the type described above from being introduced into the operation of the recording system of the present invention, the switch 114K comprises a magnetic reed switch which is operated by a magnet 148 carried by the leg 64 of the member 60. As shown in FIG. 8, the switch 114K is mounted on a bracket 150 positioned adjacent to the leg 64. Accordingly, as the leg 64 moves downwardly the magnet 148 closes the switch 114K thereby connecting the junction 113 with the encoder 116. Additionally, the switch 114K is positioned so that it will close substantially simultaneously with the stepping of the carriage 42 to the intermediate position. In other words, the switch 114K will be operated at the forward escapement mechanical commitment of the machine 10. Since members 60 and 54 both move downwardly when the zero character key 36 is depressed, switch 110 will open and switch 80 will close in the same manner as noted above.

In describing the operation of the character recording portion of the recording system thus far disclosed, it will be assumed that the character key 18 has been depressed to enter the digit "1" in the adding machine 10. Thus, the initial downward movement of the character key 18 will actuate the mechanical interlock 66, in the manner noted above, to prevent the depression of any one of the other character keys. The continued downward movement of the character key 18 causes the inner conductor 126 of the key switch 114A associated with the character key 18 to close, thereby completing the circuit from the junction 113 to the encoder 116. Moreover, the switch 114A will remain closed until the key 18 moves back to its normal or rest position. The continued downward movement of the key 18 causes the second memory pin 52 in the particular column 50 in which the digit "1" is to be entered to be moved to the operated position. Moreover, the member 54 will similarly move downwardly thereby causing the magnet 138 carried by the leg 58 to actuate the magnet reed switches 110 and 80, to open the switch 110 and to close the switch 80. This action connects the bistable multivibrator or pulse generator 78 with the junction 113. As noted hereinabove, the switch 80 will close substantially simultaneously with the stepping of the carriage 42 to the intermediate position or substantially simultaneously with the forward mechanical commitment of the machine 10.

As noted above, the transistor 84 is normally conducting and the transistor 82 is cut-off. Accordingly, the collector electrode of transistor 82 is at a high negative potential. Thus, a negative-going level will appear on the lead 118A when the switches 80 and 114A are closed thereby to cause the encoder 116 to produce signals representative of the digit "1" and record the same in the recorder 120.

It is to be noted that the recorder 120 initially places a sufficient negative bias on the lead 93 to backbias the diode 91. Hence, the capacitor 89 is initially charged by the source 99 so that the plate connected to the diode 85 is positive with respect to the other plate. After the negative level on lead 118A has been applied to the encoder-recorder for a preselected interval of time (which, in practice, is approximately 4 milliseconds), the recorder 120 operates to ground the lead 93. (Further information on this operation may be obtained by reference to the aforementioned copending application entitled "Data Transmission Apparatus and Methods.") The grounding of the lead 93 signifies an acknowledgement that the negative signal on the lead 118A has been received and a signal representative of the digit "1" has been recorded.

The grounded lead 93 allows the capacitor 89 to discharge thereby to apply a positive pulse to the base electrode of the transistor 84 through the diode 85. Consequently, transistor 84 is forced into cutoff, which drives transistor 82 into conduction and removes the negative potential on the lead 118A. Hence the multivibrator 78 changes states.

It will now be appreciated that the multivibrator 78 produces a pulse when it is connected to the recording means which includes the encoder-recorder. In other words, after the multivibrator has been connected to the encoder 116, it initially produces a negative level which then rises to approximately zero potential after a preselected interval of time has elapsed (in the illustrative example—4 milliseconds).

After a sufficient period (which, in practice, is approximately 40 milliseconds) the negative potential is again applied to the lead 93 to back-bias the diode 91 thereby to allow the capacitor 89 to recharge.

The open condition of the switch 110 permits the bistable multivibrator 78 to change states. However, the multivibrator cannot be reset until the switch 110 is closed when the operated character key 18 has moved upwardly beyond the reverse mechanical commitment level.

When the character key 18 is released, the member 54 moves inwardly thereby causing the switch 80 to open and the switch 110 to close. Since the switch 80 operates before the switch 110 due to the relative positions of the magnetic reed switches as shown in FIG. 8, the multivibrator 78 is disconnected from the junction 113 at the time the switch 110 closes. When the switch 110 closes the collector electrode of the transistor 84 is connected to ground, thereby causing the transistor to again change states so that the transistor 84 becomes conducting and the transistor 82 is cut-off. However, no negative voltage-level is applied to the encoder at this time since the multivibrator 78 is disconnected from the junction 113. Additionally, as the key 18 returns to its rest position the switch 114A will open thereby to disconnect the junction 113 from the encoder 116. Accordingly, the pulse producing network 74 will now be set to generate a subsequent pulse in response to the entry of another character into the machine 10.

When it is desired to enter the digit zero into the machine 10, the character key 36 is depressed. Accordingly, the member 60 will move downwardly in addition to the downward movement of the member 54. Thus, the switch 80 closes and the switch 110 opens in the manner indicated above. However, as noted above, because of the position of the linkage mechanism between the zero digit character key 36 and the arm 56, the switch 80 will close too early. That is, the switch 80 will close before the forward escapement mechanism of the machine 10 has been actuated. To eliminate this action, the downward movement of the member 60 will cause the switch 114K to close substantially at the same time the forward escapement mechanism is operated. Hence a negative voltage level will appear on the lead 118K and cause a zero digit to be recorded in the recorder 120 in a manner similar to that described above.

FIG. 11 is a graphic illustration of the operation performed by the character keys as a function of its travel. Initially, a character key is at rest. However, as the character key is depressed it first passes the mechanical interlock point which initiates the operation of the mechanical interlock 66 so that no other key may be depressed beyond this point. Further downward travel of the key causes the key to enter an area designated "1–9 coaxial switch operation" in which area the coaxial switches associated with the character keys 18–34 are operated. Within this area is the reverse mechanical commitment level at which point the switch 110 opens.

Further continued downward movement of the character key causes the key to pass the forward mechanical commitment level at which point the appropriate digit is entered into the memory device 40 of the machine 10 and the carriage 42 is stepped to the intermediate position. Moreover, the swith 80 is closed at this time to initiate the recording of the digit in the recorder 120. When the key reaches the bottom of the keystroke it is released and allowed to return to the reset position by means of an appropriate biasing device.

As the key moves upwardly beyond the forward mechanical commitment level, the switch 80 re-opens, thereby disconnecting the bistable multi-vibrator 78 from the junction 113. Continued upward movement of the key causes the key to move above the reverse mechanical commitment level at which point the carriage 42 is stepped to the next column and the switch 110 re-closes, thereby to reset the multivibrator. The key continues its upward movement until it reaches the rest position. It is to be noted that the same key may be depressed a number of times before it reaches the reverse mechanical commitment level without producting another pulse. That is, the multi-vibrator will not be able to produce a pulse until it is reset. However, it is not reset until the key has moved above the reverse mechanical commitment level. Hence, any irregular key motion or a dithering key-stroke which occurs before the key has risen above the reverse mechanical commitment level will not result in the generation of another pulse.

It will be noted that the only time that an entry will be made in the recorder 120 is after the machine 10 has been mechanically committed to enter a corresponding digit. To put this another way, if the character key is released before a memory pin has been moved to the operated position (i.e. before the forward mechanical commitment level is reached) the switch 80 remains open and no signal is applied to the encoder 116. Hence, a direct correspondence between the digits entered into the machine 10 and the digits recorded in the recorder 120 will always be maintained. Moreover, only one digit entry will be recorded for each mechanical entry of the machine irrespective of irregularities in the key-stroke of any particular character key.

The machine 10 also includes function keys (FIG. 1) such as an add key 150, a total and sub-total key 152, a subtract key 154 and a correct key 156. When any one of these keys is depressed the machine performs the function specified by the depressed key. For example, if the add key 150 is depressed the machine will add the number entered in the memory device 40 of the machine to the number in the memory store of the machine. If the total and sub-total key 152 is depressed, the machine will be actuated to print out the sum of all the numbers which have been entered in the machine up to that point on the paper tape record. The tape is then fed out of the opening 38 in the top surface of the machine.

When any one of the function keys 150–156 is depressed or operated to cause the machine 10 to initiate a function cycle, a drive shaft is caused to rotate which operates the print wheels (not shown) of the machine to print a number on the paper tape record and to advance the paper tape so that the operator may obtain the desired information from the machine.

The pertinent portion of the function cycle mechanism is shown in FIG. 1 and includes a drive shaft 158 which mounts a gear 160 which is operative to limit movement of the drive shaft to one rotation for each function cycle initiated in the machine 10. The elements which limit the rotation of the drive shaft to a single revolution are not disclosed in detail herein since they are not pertinent to an understanding of the recording system of the present invention. However, more information may be obtained by reference to copending application Ser. No. 620040, mentioned hereinabove.

A function cycle switch 162 is connected to the machine 10 by appropriate means (not shown) and it is positioned adjacent the drive shaft 158. Affixed to the drive shaft 158 is an eccentric cam 164 having a high area 166. The high area 166 of the cam is adapted to engage a movable button on the function cycle switch 162 to operate the switch 162 in the manner indicated hereinbelow.

Figure 12:
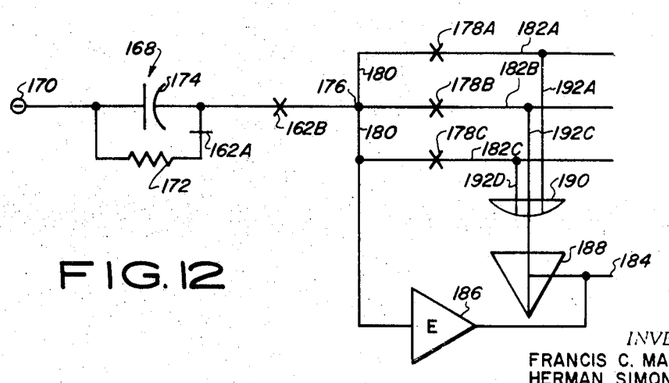
FIG. 12 is a schematic circuit wiring diagram of the function cycle portion of the recording system.

A schematic wiring diagram of the function cycle recording portion of the invention is shown in FIG. 12, and includes a pulse source designated generally by the reference numeral 168. The pulse source 168 includes a negative source of potential 170 which is connetced to an RC circuit comprising a resistor 172 and a capacitor 174. The resistor 172 is connected in parallel with the capacitor 174 through normally closed contacts 162A of the function cycle switch 162. The pulse source 168 is connected to a junction 176 through normally open contacts 162B of the function cycle switch 162. Normally, the capacitor 174 remains in a discharged state. However, when the function cycle switch 162 is operated in the manner indicated above, the contacts 162A open and the contacts 162B close thereby to connect the capacitor with the junction 176 so that the capacitor may charge through an appropriate lead thereby to produce a negative-going pulse for application to the encoder 116.

Connected to the junction 176 by a lead 180 is one side of normally open function key switches 178A–178C. The switch 178A is adapted to be closed by the key 152 when the same is depressed to initiate a total function. The switch 178B is adapted to be closed by the key 152 when the key is operated to initiate a sub-total function. The switch 178C is adapted to be closed when the key 154 is depressed to initiate a subtract function. The other side of the switches 178A–178C are connected to the encoder 116 by respective leads 182A–182C. When a pulse appears on any one of the leads 182A–182C, the encoder will be actuated to produce a signal which is indicative of the function key which has been depressed, and therefore produces a record in the recorder 120 of the function performed by the machine. A lead 184 is similarly connected to the encoder 116. If a pulse appears on the lead 184, the encoder 116 will produce a signal representative of an add function performed by the machine 10.

In the conventional business machine and in the business machine under consideration, the total, sub-total and subtract keys are normally mechanically retained in the operated position by appropriate means (not shown) until the desired function cycle has been performed by the machine. However, since the add key 150 is the most commonly operated function key in the machine, it is normally not retained by the machine. This is highly desirable from the point of view of the operator since the sensitivity of operation of the add key is measurably increased. In view of this design feature, which is inherent in business machines of the type described, a simple function switch arrangement of the type described above cannot be used to detect an add or an addition function.

To be more specific, if a switch such as 178A–178C were used, the period that the switch would remain closed would be a direct function of the manner in which the operator strikes the add key. Accordingly, if the operator releases the add key 150 prior to the operation of the function cycle switch 162 (which normally occurs approximately midway through the function cycle), the add function key switch would open thereby preventing the signal representing the add function from being applied to the encoder 116. Thus, a discrepancy will exist between the machine operation and the recorded record due to the fact that the machine has performed an add function but the function cycle has not been sensed by the recording system.

In order to eliminate any errors which might arise due to the above mechanical arrangement of the machine, the operation of the add function key 150 is sensed in a manner different than that utilized in conjunction with the total, sub-total and subtract function keys. More particularly, the lead 184 is connected to the junction 176 through a normally-on emitter follower 186. Additionally, the lead 184 is connected to the output terminals of a normally cut-off inverting amplifier 188. Hence, the potential on the lead 184 will normally be approximately zero volts. The input terminals of the inverting amplifier 188 are connected to the output terminals of a conventional OR or buffer gate 190, the input terminals of which are connected to the leads 182A–182C by respective leads 192A–192C. The switches 178A–178C may be of the coaxial type described hereinabove which are adapted to be actuated when the selected key is depressed to initiate a function cycle. Alternatively, the switches 178A–178C may be operatively associated with the linkage mechanism connecting the selected key with the operating mechanism in the machine 10. In practice, the function key switches 178A–178C are microswitches which are associated with the linkage mechanism between the function keys and the operable portions of the machine 10.

Figure 13:
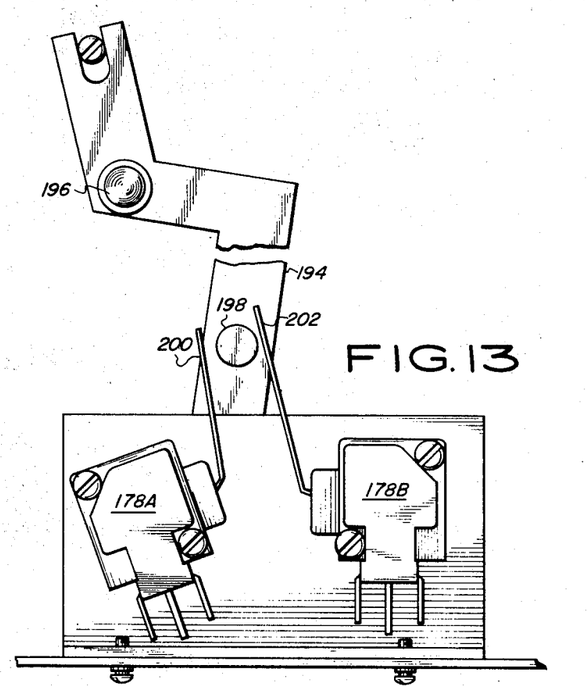
FIG. 13 is a front elevational view of the total and sub-total switch actuation assemblies.

For example, FIG. 13 illustrates the relationship between the switches 178A and 178B with respect to a link 194 which is rotatable about a pivot 196. When the function key 152 is operated to produce a total function by the machine the link 194 is pivoted in a clockwise direction about the pivot 196. On the other hand, when the function key 162 is operated to produce a sub-total function the link 194 is rotated in the counter-clockwise direction about the pivot 196.

Upstanding from the link 194 is an actuating pin 198. The pin 198 is adapted to engage and move a lever 200 extending outwardly from the switch 178A when a total function is initiated in the machine 10 thereby to close the switch 178A. In a similar manner the pin 198 is adapted to engage and move a lever 202 extending outwardly from the switch 178B to close the switch 178B when a sub-total function is initiated in the machine 10.

Figure 14:
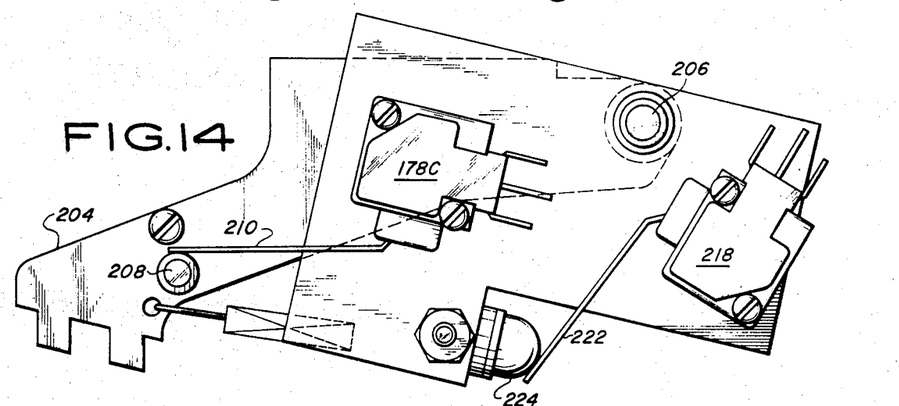
FIG. 14 is a front elevational view of the subtract and correct switch actuation assembly.

FIG. 14 illustrates the relationship between the switch 178C and a member 204 which rotates in a clockwise direction about a pivot 206 when the subtract key 154 is operated. The member 204 mounts an operating pin 208 adapted to engage a lever 210 extending outwardly from the switch 178C to close the switch 178C when the member 204 is moved in response to a subtract function.

In operation, assuming that the function key 152 is depressed to cause the machine 10 to perform a total function, the function key switch 178A will be closed to connect the lead 182A with the junction 176. Additionally, the total function cycle will be initiated in the machine 10 to cause the drive shaft 158 to rotate through a revolution in the manner described above thereby causing the cam 164 to engage and operate the function cycle switch 162. Hence, the contacts 162A will open and the contacts 162B will close. Accordingly, the capacitor 174 will discharge to produce a negative-going pulse on the lead 182A through the now closed switches 162B and 178A. This operation will cause the encoder 116 to produce a signal representing the total function performed by the machine 10. Additionally, the appearance of a pulse on the lead 182A will cause the output of the inverting amplifier 188 to maintain the lead 184 at zero potential. To be more specific, the emitter follower 186 will be cut-off due to the negative-going pulse applied to the junction 176 when the capacitor 174 discharges. However, because of the particular input design of the inverting amplifier 188, which is conventional, the amplifier will begin to conduct at the time that one of the function key switches 178A–178C is closed. Accordingly, the lead 184 will be maintained at zero potential by means of the now conducting inverting amplifier 188.

On the other hand, when the function key 150 is depressed representing the performance of an add function in the machine 10, the emitter follower will again be cut-off during the interval that the negative-going pulse is applied to the junction 176. However, no pulse will be applied to the input terminals of the inverting amplifier 188 through the OR gate 190 and accordingly the inverting amplifier will remain cut-off. Thus, during the period of cut-off of the emitter follower 186 a negative-going pulse appears on the lead 184. The appearance of the negative-going pulse on the lead 184 will cause the encoder 116 to generate a signal representing an add function (which has been performed by the machine 10).

As noted above, the adding machine 10 under consideration also includes a correct function key or slide 156. When the correct function key 156 is operated the carriage 42 is returned to the first column (units) position and any pins 52 which may have been depressed are returned to their respective non-operated positions by appropriate means (not shown).

A correct function is recorded in the recorder 120 when a pulse appears on the lead 185 which is connected to the encoder 116. The lead 185 is connected to a correct circuit 212 (FIG. 15) which operates similarly to the circuit 168. Thus, the circuit 212 includes a capacitor 214 which is connected in parallel with a resistor 216 through the normally closed contacts 218A of a switch 218. One plate of the capacitor 214 is connected to a source of negative potential 220; the other plate of the capacitor 214 is connected to the lead 185 through the normally open contacts 218B of the switch 218.

The switch 218 is mounted adjacent the switch 178C (FIG. 14) and includes an outwardly extending lever 222 which is adapted to be engaged and moved by a member 224. The member is sized and positioned so that it will move the lever 222 to operate the switch 218 when the correct key or slide 156 has been actuated and the carriage 42 has been returned to the first column position.

Figure 15:
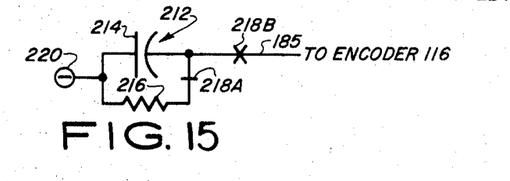
FIG. 15 is a schematic circuit wiring digram of the correct portion of the recording system of the invention.

When the switch 218 is operated, the contacts 218B close and the contacts 218A open. The capacitor 214 charges thereby to place a pulse on the lead 185 to cause a correct operation to be recorded. Thereafter, the member 224 returns to its normal position causing the contacts 218B to open and the contacts 218A to close to allow the capacitor 214 to discharge.

Accordingly, a recording system for a business machine has been disclosed in which a character is entered in the recording system only after the machine has been mechanically committed to enter the same character thereby insuring direct correspondence between the machine and the recorded entry. Additionally, means are provided to make the recording system independent of irregular key motion thereby to eliminate errors which would otherwise arise due to a malfunction of this type.

While a preferred embodiment of the invention has been shown and described herein, it will be obvious that numerous omissions, changes and additions may be made in such embodiment without departing from the spirit and scope of the present invention.

What is claimed is:

1. A recording system for recording the operation of a business machine of the type adapted to perform preselected functions on characters entered into the machine, in which the machine includes a plurality of selectively and individually operable character keys, entering means responsive to the operation of the character keys for entering the characters represented by the operated character keys into the machine; said recording system comprising recording means responsive to a signal for producing signals representative of the operated character keys and for recording the signals representing the sequential operation of the character keys, signal producing means for producing a signal to operate said recording means, and character key switch means including respective character key switches for at least preselected ones of said character keys responsive to the operation of the associated character key for connecting said signal producing means with said recording means, said signal producing means including a signal generator responsive to the connection with said recording means for producing a signal, and connecting means actuable by the operation of a character key for connecting said signal generator with said character key switch means.

2. A recording system as in claim 1, in which said connecting means includes a normally open first switch connected between said characted key switch means and said signal generator, an actuating means operatively associated with said first switch for closing said first switch when said actuating means is moved from a first position to a second position, and a member connected to said actuating means and adapted to be operated by the character keys for moving said actuating means to the second position when a character key is operated.

3. A recording system as in claim 2, in which said first switch comprises a normally open magnetic reed switch, and said actuating means comprises a magnet adapted to close said magnetic reed switch when said magnet is moved adjacent said magnetic reed switch, said member being positioned to move said magnet adjacent to said magnetic reed switch to close said switch when a character key is operated to enter a character into the machine.

4. A recording system as in claim 1, in which said signal producing means further includes signal limiting means responsive to the operation of a character key for limiting the signals produced by said signal generator to a single pulse during the operation of any one character key.

5. A recording system as in claim 4, in which said connecting means includes a normally open first switch, and said signal limiting means includes a normally closed second switch, said signal limiting and connecting means further including a common actuating means for opening said second switch when said actuating means is moved from a first position to a second position and for closing said first switch when said actuating means is moved from said second to a third position, and a member connected to said actuating means and positioned to be operated in response to the operation of a character key for moving said actuating means from said first to said second to said third positions in sequence.

6. A recording system as in claim 5, in which said first switch includes a first normally open magnetic reed switch, and said second switch includes a second normally closed magnetic reed switch, and said actuating means comprises a magnet adapted to open said second magnetic reed switch and to close said first magnetic reed switch when said magnet is moved adjacent said first and second magnetic reed switches, said magnet being positioned on said member to be moved successively adjacent said second and first magnetic reed switches as a character key is operated.

7. A recording system as in claim 1, in which said signal generator comprises a bistable multivibrator movable between a first and a second state, said multivibrator being movable from said first state to said second state to produce a pulse a preselected interval of time after said multivibrator has been connected to said recording means through said connecting means and a character key switch means, and means connected to said multivibrator to prevent movement of said multivibrator from said second state to said first state until the operated character key has reached a predetermined point in its travel from an operated position to a rest position and for moving said multivibrator to the first state after the operated character key moves beyond said predetermined point.

8. A recording system as in claim 1, in which the machine includes a plurality of function keys operable to cause the machine to sense the characters entered into the machine and to perform a selected function, said recording means being further responsive to a pulse for producing signals representative of the operated function keys and for recording the signals representing the sequential operation of said character and function keys, pulsing means responsive to a function cycle of the machine for producing a pulse to operate said recording means, and a function key switch for preselected ones of said function keys responsive to the operation of an associated one of said preselected function keys for connecting said pulsing means with said recording means.

9. A recording system as in claim 8, in which said function key switches include an input side and an output side, and said pulsing means including a first pulse source connected to the input side of said function key switches, and a second pulse source connected to the output side of said function key switches and to said first pulse source and being responsive to a pulse from said first pulse source to generate a pulse in the absence of an operated function key switch.

10. A recording system as in claim 8, in which said pulsing means includes a pulse source, and a switch responsive to a function cycle performed by said machine for connecting said pulse source with said function key switches.

11. A recording system for recording the operation of a business machine of the type adapted to perform preselected functions on characters entered into the machine, in which the machine includes a plurality of selectively and individually operable character and function keys; said recording system including recording means responsive to an operate signal for producing character signals representative of the operated character keys and recording the character signals representing the sequential operation of the character keys and for producing an acknowledgement signal after recording the character signals, signal producing means for producing an operate signal to operate said recording means, and character key switch means including respective character key switches responsive to the operation of the associated character key for connecting said signal producing means with said recording means through respective paths, said signal producing means including a signal generator normally producing said operate signal at its output and being responsive to said acknowledgement signal for removing said operate signal from its output, and connecting means actuable by the operation of a character key for connecting the output of said signal generator with said character key switch means.

12. A recording system as in claim 11, in which said signal generator includes signal limiting means responsive to the operation of any character key for preventing the regeneration of an operate signal at said signal generator output until the operated character key has returned to the non-operated position.

13. A recording system as in claim 11, in which said signal generator comprises a bistable multivibrator movable from a first to a second state in response to the reception of said acknowledgement signal, and re-set means responsive to the movement of a character key to its non-operated position for moving said multivibrator from the second to the first state.

14. A recording system as in claim 13, in which said connecting means comprises a normally open first magnetic reed switch, a magnet adapted to be moved adjacent said first magnetic reed switch for closing said switch, and a member mounting said magnet and adapted to be moved by said character when a character key is operated for moving said magnet adjacent said first magnetic reed switch to close said switch.

15. A recording system as in claim 14, in which said re-set means includes a normally closed second magnetic reed switch, said magnet being adapted to open said second magnetic reed switch when moved by said member in response to the operation of a character key.

16. A recording system as in claim 15, and bracket means for mounting said first and second magnetic reed switches on the machine and for positioning said switches so that said second magnetic reed switch opens prior to the closing of said first magnetic reed switch as said magnet is moved in response to the operation of a character key.

References Cited

UNITED STATES PATENTS

| | | | |
|---|---|---|---|
| 2,856,130 | 10/1958 | Woodward et al. | 235—145 |
| 2,969,176 | 1/1961 | Anderson | 235—60.18 |
| 3,206,114 | 9/1965 | Durand | 235—61 |
| 3,363,835 | 1/1968 | Mailer | 235—61 |

STEPHEN J. TOMSKY, Primary Examiner

U.S. Cl. X.R.

235—60.18, 145